US007664806B1

(12) United States Patent
Koudas et al.

(10) Patent No.: US 7,664,806 B1
(45) Date of Patent: Feb. 16, 2010

(54) ROUTING XML QUERIES

(75) Inventors: Nikolaos Koudas, New York, NY (US);
Divesh Srivastava, Summit, NJ (US);
Michael Rabinovich, Gillette, NJ (US)

(73) Assignee: AT&T Corp., New York, NY (US)

( * ) Notice: Subject to any disclaimer, the term of this patent is extended or adjusted under 35 U.S.C. 154(b) by 357 days.

(21) Appl. No.: 10/830,285

(22) Filed: Apr. 22, 2004

Related U.S. Application Data

(60) Provisional application No. 60/464,587, filed on Apr. 22, 2003.

(51) Int. Cl.
*G06F 7/00* (2006.01)
*G06F 15/16* (2006.01)
(52) U.S. Cl. ........................... 707/899; 709/206
(58) Field of Classification Search ......... 709/238–243, 709/206, 203; 707/3, 10, 7, 999.001, 899
See application file for complete search history.

(56) References Cited

U.S. PATENT DOCUMENTS

| | | | | |
|---|---|---|---|---|
| 5,596,719 | A * | 1/1997 | Ramakrishnan et al. | 709/241 |
| 5,946,679 | A * | 8/1999 | Ahuja et al. | 707/3 |
| 6,055,561 | A * | 4/2000 | Feldman et al. | 709/200 |
| 6,952,740 | B1 * | 10/2005 | Cain et al. | 709/238 |
| 2002/0147810 | A1 * | 10/2002 | Traversat et al. | 709/224 |
| 2004/0010492 | A1 * | 1/2004 | Zhao et al. | 707/3 |
| 2004/0044727 | A1 * | 3/2004 | Abdelaziz et al. | 709/203 |
| 2004/0064512 | A1 * | 4/2004 | Arora et al. | 709/206 |
| 2004/0083306 | A1 * | 4/2004 | Gloe | 709/245 |

OTHER PUBLICATIONS

Nick Kouda et al., Wed Dec. 1999, http://www.research.att.com/~divesh/papers/krsy2004-routing.poster.pdf, "Routing XML Queries".*

* cited by examiner

*Primary Examiner*—Hung T Vy

(57) ABSTRACT

A vast amount of information currently accessible over the Web, and in corporate networks, is stored in a variety of databases, and is being exported as XML data. However, querying this totality of information in a declarative and timely fashion is problematic because this set of databases is dynamic, and a common schema is difficult to maintain. The present invention provides a solution to the problem of issuing declarative, ad hoc XPath queries against such a dynamic collection of XML databases, and receiving timely answers. There is proposed a decentralized architectures, under the open and the agreement cooperation models between a set of sites, for processing queries and updates to XML data. Each site consists of XML data nodes. (which export their data as XML, and also pose queries) and one XML router node (which manages the query and update interactions between sites). The architectures differ in the degree of knowledge individual router nodes have about data nodes containing specific XML data. There is therefore provided a method for accessing data over a wide area network comprising: providing a decentralized architecture comprising a plurality of data nodes each having a database, a query processor and a path index, and a plurality of router nodes each having a routing state, maintaining a routing state in each of the router nodes, broadcasting routing state updates from each of the databases to the router nodes, routing path queries to each of the databases by accessing the routing state.

12 Claims, 6 Drawing Sheets a) Throughput, Data node selectivity 0.1 b) Throughput, Data node selectivity 0.3 c) Throughput, Memory Fraction 0.27 d) Throughput, Memory Fraction 0.48

ROUTING XML QUERIES

CROSS-REFERENCE TO RELATED APPLICATIONS

This application claims priority of U.S. Provisional Application No. 60/464,587, filed on, Apr. 22, 2003, which is incorporated by reference herein.

BACKGROUND OF THE INVENTION

1. Field of the Invention

This invention relates to an architecture for providing transparent access to heterogeneous XML data over the a wide area network such at the internet.

2. Description of Related Art

A vast amount of information currently accessible over the Web: and in corporate networks, is stored in databases. For example, in a service provider company like AT&T, there are a large number of useful databases containing information about customers, services (e.g., ordering, provisioning, and billing databases), and the infrastructure used to sup-port these services. Similarly, there are a huge number of publicly accessible datasets over the Web on a variety of subjects, such as genetics, which provide information about nucleotide sequences, gene expression data, reference sequences, etc.; and finance, which provide historical and current information about the stock market, periodic statistics about the economy and the labor markets, etc. To retrieve information from these databases, users typically have to: (i) identify databases that are relevant to their task at hand, and (ii) separately issue queries against each of these databases. This process can be quite onerous, especially since there are many different data representations and query mechanisms: legacy databases (for example, IBM's IMS) and specialized formats (e.g., ISO's ASN.1) abound. The task of identifying relevant databases is made more challenging by the dynamic nature of this collection of databases: new databases appear often, database schemas evolve, and databases (just like Web sites) disappear. In this environment, the goal of providing a mechanism to issue declarative, ad hoc queries against this dynamic collection of heterogeneous databases, and receive timely answers, remains elusive. The recent trend of publishing and exchanging a wide variety of data as XML begins to alleviate the issue of heterogeneity of databases/datasets accessible over the Web and in corporate networks. One can represent the contents of relational databases and legacy IMS databases as XML, just as datasets represented in the ASN.1 format can be transformed, into XML. XML query mechanisms, such as XPath and XQuery can then be used for uniformly posing queries against these databases, without the user having to know the specific data representation and query mechanism used natively by these databases. Several approaches proposed in the literature provide partial solutions to the problems of identifying relevant databases, and locating desired query answers, these solutions include:

Traditional data integration technology seeks to provide a single integrated view over a collection of (typically domain-specific) databases. Applications of this technology include systems for querying multiple flight databases, movie databases, etc. The principal advantages of this approach include the ability to pose declarative, ad hoc queries without needing to know the specific backend databases, and being able to receive timely answers. However, considerable manual effort is involved in the task of schema integration, and it is not obvious how this technology can be used in a flexible way over a dynamic collection of heterogeneous databases.

Conventional Web search engine technology over static documents is based on spidering the documents, building a single site index over these documents, and answering keyword queries for document location using this index. For this technology to be potentially applicable to our problem, the contents of these databases would need to be published as static Web documents, which is rarely feasible. The principal advantage of this approach is the ability to pose (simple, keyword) queries against a dynamic collection of heterogeneous databases, without explicit schema integration. However, timeliness issues (search engine indices tend to be out of date), the lack of query expressiveness, and the infeasibility of publishing database contents as static Web documents, make this approach less than ideal for querying frequently updated databases. Recent peer-to-peer (see, e.g., and data grid technologies have proven useful in locating replicas of files (e.g., music files) and datasets (e.g., in collaborative science and engineering applications), specified by name, using centralized and distributed metadata catalogs. The principal advantage of applying these technologies for our problem is the ability to locate and access information in a timely fashion. However, it is not clear how these technologies could be used to provide declarative query access over a dynamic set of databases.

The present invention provides a solution to the problem of issuing declarative, ad hoc queries against such a dynamic collection of XML databases, and receiving timely answers. Specifically the present invention provides decentralized architectures, under the open and the agreement cooperation models between a set of sites, for processing XPath queries and updates to XML data. The architectures of the present invention model each site as consisting of XML data nodes (which export their data as XML, and also pose XPath queries) and one XML router node (which manages the query and update interactions between sites). The architectures differ in the degree of knowledge individual router nodes have about data nodes containing specific XML data. The system and method of the present invention further develop the internal organization and the routing protocols for the XML router nodes, that enable scalable XPath query and update processing in these decentralized architectures. Since router nodes tend to be memory constrained, and the routing states maintained at the router nodes are storage intensive, we facilitate a space/performance tradeoff by permitting aggregated routing states, and developing algorithms for generating and using such aggregated information at router nodes. The present invention experimentally compares the scalability of our architectures and the performance of the query and update protocols, using a detailed simulation model, varying key design parameters.

SUMMARY OF THE INVENTION

The present invention provides a method for accessing data over a wide area network comprising: providing a decentralized architecture comprising a plurality of data nodes each having a database, a query processor and a path index, and a plurality of router nodes each having a routing state, maintaining a routing state in each of the router nodes, broadcasting routing state updates from each of the databases to the router nodes, routing path queries to each of the databases by accessing the routing state.

BRIEF DESCRIPTION OF THE DRAWINGS

The various features, objects, benefits, and advantages of the present invention will become more apparent upon reading the following detailed description of the preferred embodiment(s) along with the appended claims in conjunction with the drawings, wherein like reference numerals identify like components throughout, and:

DETAILED DESCRIPTION OF THE INVENTION

Figure 1:
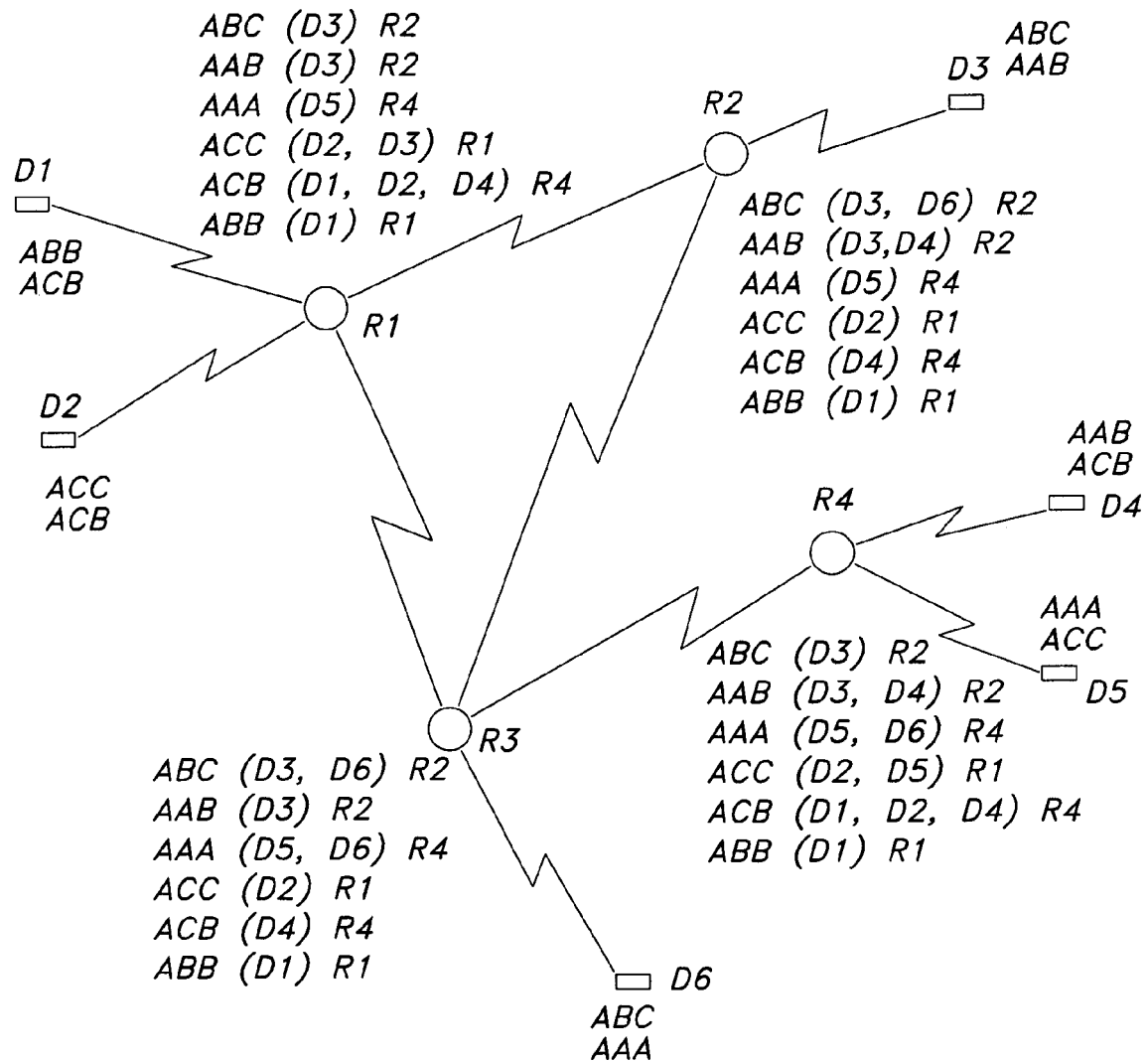
FIG. 1 is a block diagram of a coordinator protocol query scenario according to the present invention.

There will be detailed below the preferred embodiments of the present invention with reference to the accompanying drawings. Like members are designated by like reference characters in all figures.

The present invention provides a system and method for declarative and timely access to data residing in a heterogeneous, dynamic collection of data sources, exporting XML data. A variety of choices for a declarative XML query language exist, and we choose, for reasons of simplicity and prevalence, to focus on tree-structured queries with wildcards, expressible in X Path with child ("/") and descendant ("//") axes; answers to queries are returned in the standard way specified by XPath. There is first formulated and described a few key design objectives, before presenting alternative cooperation models for addressing the problems set forth.

A primary objective of the present invention is to make the declarative query access data source agnostic; users and applications issue queries against the totality of the XML data, and it is the task of the system to identify all data sources and data elements relevant to this query. This objective is necessitated by the heterogeneity of the XML data sources and differs from the model used by federated databases where queries need to explicitly specify relevant data sources. An additional design objective is for the architecture of the present invention is to be scalably adaptive to a changing number of data sources and evolving data source schemas; addition and removal of data sources and evolution of data sources should be handled in an efficient and transparent manner. This objective is necessitated by the dynamic nature of the data sources that we would like to access. A consequence of this goal is that the manually intensive approaches used currently for schema mediation and integration are unlikely to be of use in this scenario. Automated approaches that derive schemas based on the data, e.g., the Data Guide are potentially more beneficial. The third design objective is that of information timeliness and accuracy; modified data should be quickly available to matching queries, and returned query results should not be stale. A consequence of this goal is that queries should be (preferably) answered by the relevant data sources, and that modifications to the underlying data sources need to be rapidly and automatically advertised by the system. The candidate architectures of the present invention is implemented by cooperation models as further described below.

The architectures of the present invention abstract the dynamic collection of XML databases available as a set of communicating sites, with each site consisting of zero or more data nodes (i.e., individual XML databases), and one router node. A simple site consists of one data node and a co-located router node, and a router site consists of only a router node. The functionality of an XML router node is analogous to that of Internet routers, and is responsible for interacting with the XML data nodes at its site, and the XML router nodes at other sites in the system, to manage the query and update interactions between sites. XML data nodes wishing to make their data available for querying, or to issue queries, will connect to XML routers at their site. XML router nodes will maintain the required indexed information, to enable them to identify data nodes that contain data relevant to queries, in their local routing states. Our architectures differ in their degrees of shared knowledge about data nodes containing specific XML data. This is determined by the cooperation model employed by the architecture. The two main models we consider are the open model, where each site is allowed to know about and potentially communicate with every other site in the system, and the agreement model where each site enters into bilateral agreements with some other sites called its neighbors. In the agreement model, a site only knows about and can communicate with its neighbors; the agreements create finks connecting sites and the overall system becomes a graph of the agreement links overplayed on top of the network that provides physical connectivity, effectively constructing an overlay network. In the open model, sites can communicate directly using the physical IP connectivity, or any overlay network that provides higher-level connectivity between the different sites participating in the system. As we will see in subsequent sections, the different cooperation models have an impact on the kinds of information that can be contained in the routing states at individual router nodes, and the information that can be exchanged between sites in the query and update routing protocols.

The Open Model

Described below is the architecture under the open cooperation model, and describe two routing protocols-replication and coordinator-used in this architecture. Aggregated routing states, and an experimental comparison of these protocols, are presented in latter sections.

Routing State

The architecture under the open cooperation model permits each site to know about the XML data at other sites in the system, maintained in the routing states at the router nodes. Maintaining entire XML databases in the routing states is undesirable, both in terms of the storage required and the update traffic to propagate all database updates to multiple router nodes. A better alternative is to maintain, in the routing state, indices that map XML data items to the data nodes that contain those data items. This can substantially reduce the update traffic, since an XML data item up-date need not be propagated to the router nodes, unless it changes (i.e., adds to or removes from) the set of data items at that data node. Path indices which treat paths in the XML data tree as the index keys, are a natural choice for the internal organization of the routing state, and can be used to efficiently identify data nodes that are relevant to an XPath query. The exact nature of the path index depends on the XPath queries that need to be efficiently answered. While tree structures on the root-to-leaf data paths suffice for exact and prefix branching path queries, suffix trees would be beneficial for XPath queries with recursion (//). The technique of the present invention is adaptable to either choice.

The Replication Protocol

The most straightforward decentralized protocol for updates and queries in this architecture is one where all sites are responsible for query redirection. Each site is responsible for broadcasting additions and deletions of XML paths in their data to all sites, each of which in turn is responsible for updating its routing state, maintaining, in indexed form, information about the data exported by all XML data nodes. Using this information, each router node acts as an elaborate search engine, matching queries against its routing state and identifying relevant data nodes to the query initiator. This is referred to as the replication protocol. The main strengths of this protocol are its simplicity and conceptual appeal. It is data source agnostic, since queries do not need to specify relevant data nodes. It naturally splits the query load between the different sites in the system. It can dynamically adapt to a changing number of data nodes and evolving data node schemas, through simple standard protocols (e.g., periodically exchanging KEEP ALIVE messages). Further, since router nodes only redirect queries, it can easily comply with the information timeliness requirement for data modifications. The biggest weaknesses of the replication protocol is scalability, both in terms of storage required and the update load. Each site's routing state is required to maintain the complete index, and—maintaining consistency under updates becomes formidable, since up-dates have to be propagated to each site. The coordinator protocol, discussed next, alleviates these weaknesses of the replication protocol.

The Coordinator Protocol

The goal of the coordinator protocol is to devise an approach, under the open model, where the load for both update and query processing is shared. The key to satisfying this goal is to relax the requirement, in the replication protocol, that each XML router node must have complete knowledge of the data nodes, for each XML data path in the system. The coordinator protocol still requires each router node to be aware of all the data paths in the system, but a router node only needs to have complete knowledge of the data nodes/or a subset of the data paths existing in the system.

Routing State

Specifically, each XML data path has a coordinator site that is responsible for tracking all relevant data nodes for this path. The routing states conceptually contain tuples of the form $(p_k, \{D_i\}, C_k)$ where $p_k$ is an XML data path, $\{D_i\}$ is the set of data nodes that, the router node believes, have $p_k$ and $C_k$ is the router node of $p_k$'s coordinator site. Only the coordinator router node is required to maintain the correct and complete set of data nodes containing $p_k$ the rest of the router nodes maintain this information only as performance hints. Since the coordinator does not change when data nodes add or delete the path, path updates require processing only at the coordinator but not the rest of the sites.

Update Processing

Data nodes advertise two kinds of updates: path insertion and path deletion. A path insertion advertisement $A^+=(D_i, p_k, +)$ is used only when a new path $p_k$ is created in some document $d_j$ at data node $D_i$. If a path that is newly added to a document at $D_i$ existed in some other document at that data node, no path insertion advertisement is made. Similarly, a path deletion advertisement $A^-=(D_i, p_k, -)$ is made when no other document at that data node contains that path. A path insertion $(D_i, p_k, +)$ involves the following protocol:

- $D_i$ informs its router node $R_i$ about $p_k$, which looks up $p_k$ in its routing state.
- If the path is found, $R_i$ sends advertisement $A^+=(D_i, p_k, +)$ to $p_k$'s coordinator router node and terminates.
- If the path is not found, then no other data node has this data path.[1] Then, $R_i$ self-selects itself as the coordinator of path $p_k$, adds the tuple $(p_k, \{D_i\}, R_i)$ to its routing state, and boradcasts the message "Coordinator($p_k, \{D_i\}, R_i$)" to all other router nodes in the system.
- A router node receiving message "Coordinator($p_k, \{D_i\}, R_i$)" adds the tuple $(p_k, \{D_i\}, R_i)$ to its routing state.
- A router node receiving path advertisement $A^+=(D_i, p_k, +)$ updates its routing state by adding $D_i$ to the set of data nodes asociated with path $p_k$.

follow a similar method as path additions.

Query Processing

There is now described an XPath query Q, posed by node $D_i$, is processed using the coordinator protocol. Assume, for simplicity, that query $Q=p_k$ is a simple root-to-leaf path (no branching, no intermediate "//"). The query processing protocol is as follows:

- $D_i$'s router node $R_i$ looks up path $p_k$ in its routing state. If no such path exists, the query returns an empty result. Otherwise, let the routing state at $R_i$ contain tuple $(p_k, S1, C_k)$.
- $R_i$ forwards the query $p_k$ to the set of data nodes in S1, and sends the message "QuerySent($p_k$, S1)" to the path coordinator $C_k$.
- When a router node $C_k$ receives message "QuerySent($p_k$, S1)" from $R_i$, $C_k$ looks up $p_k$ in its routing state. $C_k$ idenitifies data nodes S2 containing $p_k$ that are not included in the set S1, and returns them to $R_i$.[2]
- Upon receiving set S2 from $p_k$'s coordinator, $R_i$ forwards query $p_k$ to the set of data nodes in S2. $R_i$ also adds data nodes in S2 to its routing state to reflect its knowledge of data nodes that contain path $p_k$. Subsequent $p_k$ queries from $D_i$ will be immediately sent to the data nodes in S1∪S2, reducing the response time of query answering.
- When a data node receives a query $p_k$ is executes it locally and returns the result to the originator of the query.
- Upon receiving all query reponses, $R_i$ combines them and returns it to $D_i$. $R_i$ also removes all data nodes that returned empty reponses from its routing state entries for $p_k$.

For more complex XPath queries, the query routing protocol additionally involves performing set operations (unions and intersections) on the sets of data nodes obtained from the routing state, and from the coordinator nodes.

Complex Query Processing:

The query processing described above was for the case of simple root-to-leaf path queries with no intermediate "//" or branching. There is hereinafter described our approach to identify data nodes that potentially contain answers to more complex XPath queries. Suppose the query is a non root-to-leaf path $p_o$. Let $p_1, \ldots p_n$ be root-to-leaf paths in the routing state that embed $p_o$ (preserving parent-child and ancestor-descendant edges). Then, the relevant data nodes of $p_o$ can be computed as the union of the sets of data nodes for $p_1, \ldots p_n$, obtained from the routing state, and from the coordinator nodes. Suppose the query is a branching query $p_o$. Let $p_1, \ldots p_n$ be the paths constituting $p_o$. Then, the relevant data nodes of $p_o$ can be computed as the intersection of the sets of data nodes for $p_l, \ldots p_n$. Note that each of the data nodes in the result of taking unions (in the first case) is guaranteed to contain a match to the query path. However, taking intersections is conservative since a data node may not contain any match to the twig query, even when it contains matches to each of the constituent paths in the twig. The following result establishes the correctness of the coordinator protocol for query processing, based on the intuition that a site that is a coordinator for a given data path is guaranteed to contain complete information about the data nodes that contain that data path.

Proposition 1 Consider a set of data nodes whose XML databases have been advertised using the up-date processing of the coordinator protocol. Then any XPath twig query posed at any of the sites is guaranteed not to miss any data node that contains potentially relevant data.

An Example

Turning now to FIG. 1 there is depicted a system, after a number of paths have been inserted. For simplicity, were present paths as strings from a simple "tag" alphabet A,B,C and present the sample operation of our protocols. Below each data node, the figure presents the paths the node exports 100. Below each router node, the routing state is shown 102 (the sets of data nodes in the routing entries indicate information obtained from past queries). Assume that, at data node D6 104, the path ABB is added. D6 104 sends a message to the router node to which it is connected, R3 106, informing the router about its new path. Router R3 106 examines its routing state and identities that the path is present in the system and that R1 108 is the coordinator for this path. R3 106 adds D6 104 to its entry for ABB and sends advertisement (D6, ABB,+) to R1, 108 notifying this router about the new path at Ds. Upon receiving this message, R1 108 updates its routing state, inserting node D6 104 in the list of data nodes containing path ABB. Assume now that D5 110 issues the query ABC. It forwards the query to R4 112. Router R4 112, examines its routing state and find the entry for this path. From it, R4 112 identifies router R2 114 as the coordinator for this path. Moreover, the router node is aware that D3 106 contains the path so it sends a query message to D3 106 with the query path ABC. Node D3 106 answers the query and ships the results back to R4 112 which forwards them onto to D3 106. In the meantime, router R4 112 sends "QuerySent(ABC, {D3})" to the coordinator node R2 114. Upon receiving this message, router R2 114 examines its routing state entry for ABC, compares it with {D3 106}, and sends only {D6 104} to back R4 112. R4 112 then adds {D6 106} to its routing state entry for ABC and sends the query to D6 106, via R3 106.

The coordinator protocol, under the open model, as described herein, would meet the following objectives. Query access would be data source agnostic, since the XML router nodes in the system would be responsible for identifying relevant XML data nodes. The architecture would be modular, scalably adapting to issues arising from dynamic additions/removals and evolution of data nodes. Indeed, update processing is shared since each path update involves only the coordinator for that path, and query processing is shared because each query involves only the router of the originating site and the relevant coordinators (in addition to the relevant data nodes that answer the query). Moreover, modifications at the XML data nodes should be available for querying in a timely and accurate manner.

The Agreement Model

When sites are not allowed to learn identities of and communicate with arbitrary sites in the system, a more sophisticated protocol is required. In this setting, each site can only ask queries from its neighbors; the neighbors must respond with query results, perhaps first obtaining those results through their own neighbors, and so on. In effect, the query is forwarded from neighbors to neighbors along the overlay network defined by the agreement links, and query results are trickled back to the query originator. In the following section there is described an XML routing protocol designed for the agreement model, and experimentally compare it with the protocols under the open cooperation model in a later section.

Routing State

The architecture under the agreement cooperation model permits each site to only know about and communicate with its neighbors. Hence, the routing states only keep track of neighboring (data and router) nodes with each XML data path. The routing states conceptually contain tuples of the form $(p_k, \{N_j\})$ where $p_i$ is an XML data path, and $\{N_j\}$ is the set of neighboring data and router nodes to which, the router node believes, the query for $p_k$ needs to be forwarded to reach data nodes containing $p_k$. Unlike the routing states associated with the replication and the coordinator protocols, no router node needs to maintain the correct and complete set of data nodes containing any data path $p_k$. When the overlay network of the agreement links is an arbitrary graph, a key problem that arises is duplicate routing, which occurs when different neighbors unknowingly route a query or update to the same sites. An even more serious problem is that update blocking, which we describe later and which is essential for the scalability of the system, can lead to correctness issues where a query does not reach some relevant data nodes. Both these problems are avoided if communication between neighbors is restricted to spanning trees of the overlay network of agreement links. This observation is used in the update and query processing performed in the spanning tree protocol, under the agreement model, described next.

Update Processing

As in the coordinator protocol, data nodes advertise path insertions and path deletions. Let T be a spanning tree over the overlay network. When a data node Di inserts a new path pk it sends advertisement A+=(Di,pk, +) to its associated router. Any router Ri that receives an advertisement (Ns, pk, +) (initially the router associated with Di), executes the following protocol:

$R_i$ looks up $p_k$ in its routing state. If the data path is not found, $R_i$ creates an entry $(p_k, \{N_8\})$ in its routing state, where $N_8$ is the neighbor from which $R_i$ received the advertisement. Then $R_i$ sends the advertisement $(R_i, p_k, +)$ to all its neighbors in the spanning tree T except $N_8$. Otherwise, let $(p_k, \mathcal{N})$ be the old entry for $p_k$.

If $N_8 \in \mathcal{N}$ then terminate.

If $\mathcal{N}$ contains only one neighbor and the neighbor is a router node (as opposed to a data node), then send advertisement $(R_i, p_k, +)$ to that neighbor and add $N_8$ to $\mathcal{N}$. Otherwise, just add $N_8$ to $\mathcal{N}$.

When a data node no longer has path Pk in its local database, it sends a negative advertisement to its router. A router Ri receiving a negative advertisement (Ns,pk,−) looks up Pk in its routing state. Since the routing state includes all data paths in the system, there must be an entry for Pk: (Pk,.N). Ri then executes the following steps:

Remove $N_8$ from $\mathcal{N}$.

If $\mathcal{N}$ becomes empty, send the advertisement $(R_i, p_k, -)$ to all neighbors in the spanning tree T except $N_8$, and terminate.

If $\mathcal{N}$ contains only one neighbor and it is not a data node, send advertisement $(R_i, p_k, -)$ to that neighbor and terminate.

In essence, advertisements with path addition propagate along the spanning tree but are blocked by a router that already has more than one (next-hop) neighbor in the routing state for this path. Path deletions are blocked by the first router that has more than one remaining (next-hop) neighbor in its corresponding entry. It is because of this blocking that not all routers are involved in processing an update and thus update processing load is shared.

Query Processing

Simple, root-to-leaf path query processing in the spanning tree protocol is straightforward. A data nodes sends query Pk to its associated router. A router that receives query pk looks up Pk in its routing state and forwards the query to its next-hop neighbors in the spanning tree, except the one from which it received the query. This is done until the query reaches data nodes, which execute it and send the result to their routers. The query results from data nodes backtrack the routing paths in the spanning tree taken by the query, eventually arriving at the query originator, which combines the results. Complex XPath query processing involves taking unions and intersections of the sets of neighbor nodes, at each router, in a fashion similar to that discussed in the case of the coordinator protocol. The following result establishes the correctness of the agreement protocol for query processing. The intuition is that, even though updates are blocked during update processing in the agreement model, the query processing protocol is guaranteed to reach all router nodes in the overlay topology (through the spanning tree next-hops) that contain information about relevant data nodes.

Theorem 1 Consider a set of sites connected by an overlay network consisting of a set of agreement links, and let T be any spanning tree of this overlay network. Suppose the data contained in the data nodes oct these sites has been advertised using the update processing of the agreement protocol over T. Then any XPath twig query posed at any of the sites is guaranteed not to miss any data node that contains potentially relevant data, provided the query processing uses the spanning tree T.

Just as in the coordinator protocol, more complex queries are processed by taking unions or intersections of relevant sets of next hop neighbors.

Scalability: Multiple Spanning Trees

The spanning tree protocol as presented so far effectively distributes the update processing load because of blocking. However, there is a potential scalability problem for query processing. Assume, for example, a balanced binary spanning tree on the overlay network, with all data nodes as leaves. Then the "root" of this tree has to process each query that originates anywhere in its left sub tree and is addressed to any data node in its right sub tree and vice versa. Even if we assume that each query is destined to exactly one data node, in the uniformly distributed workload, roughly half of the queries originating in one of the sub trees will be destined to the other sub tree, so the root would have to process half of all queries in the system, and be-comes the bottleneck. A similar problem arises when processing initial update advertisements, i.e., the first time a data path appears at any of the data nodes in the system. To overcome this problem, we allow the spanning tree protocol to use multiple spanning trees. We precompute a number of different spanning trees and hash an arbitrary data path in the system to one of these spanning trees. Different data paths are now processed using different spanning trees, with different "roots", and the query and update loads are distributed among multiple roots. Since different paths may be hashed to different spanning trees, complex query processing is slightly different from the case of a single spanning tree. Essentially, unions and intersections of sets of neighbors need to be computed on a per-spanning tree basis.

An Example

Figure 2:
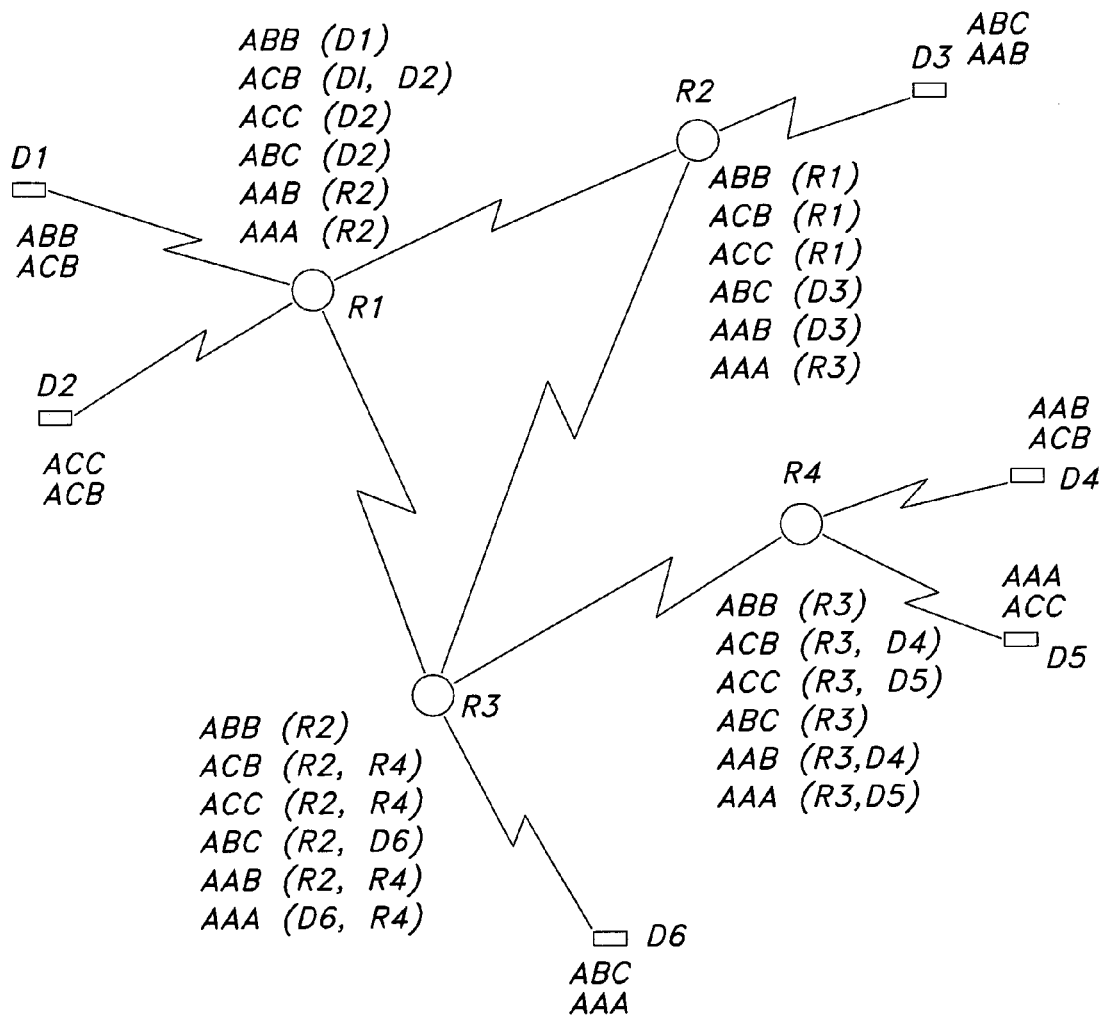
FIG. 2 is a block diagram of a spanning tree protocol query scenario according to the present invention.

Turning now to the system shown in FIG. 2, there is depicted the same set of routers and data nodes as FIG. 1, but this time the spanning tree protocol is deployed. Assume that only one spanning tree is used (R1-R2-R3-R4), shown in bold lines in FIG. 2. The routing state in each router is derived assuming that each data node sent advertised all its paths in a singe batch, and the sequence of these updates in the system was D1, D2, D3, D6, D4, D5. Assume that data node D6 adds the path ABB. Node D6 sends a path advertisement (D6, ABB, +) to the router it is connected, R3, informing the router about the new path. The router looks up its routing state and identifies that the path is present and that there is a single neighboring router, R2, associated with the path. Thus, R3 sends the advertisement (R3, ABB, +) to R2 and adds D6 to the set of neighbors associated with this path, so that R3's entry for this path becomes (ABB, {R2, D6}). Similarly, upon receiving the advertisement from R3, router R2 in turn sends its own advertisement to R1, which would add +R2 to its neighbor set for this path. Furthermore, R2 adds R3 to its set of neighbors for ABB, so that its entry becomes (ABB, {R1, R3}). If data node D4 now added path ABB, it would send this update to its neighboring router, R2. R2 would add D4 to the set of neighbors for ABB but would block any further update propagation, because R2 already had more than one neighbor for this path before adding D4. Assume that node D5 issues the query ABC. It forwards the query to R4, which looks up its routing state and identifies that the query has to be forwarded to router R3. R3 looks up the path in its routing state and find its associated neighbors D6, R2. R3 sends the query to D6, which answers the query locally and send the results back to R4 via R3, and R4 forwards them to D5. Router R3 also forwards the query to R2, which then ships the query to Ds. Router R3 does not propagate the query further. Data node D3 answers the query and ships the results back to R4 (via R2 and Rs) which forwards them to D5.

Routing State Aggregation

In any of the protocols described above, be it the replication, the coordinator, or the spanning tree, it is important to allow fast lookups in the routing state. These routing states are typically quite large, since they contain at least all the root-to-leaf data paths exported by the data nodes (even when they do not contain all the data nodes containing these data paths), and may additionally contain suffixes of root-to-leaf data paths. Thus, routing states are expected to be on disk. It is thus expensive to rely on routing state lookups for processing each query, especially in the spanning tree protocol where lookups occurs at multiple router nodes on the way from the query originator to the relevant data nodes.

In order to ensure fast lookup, the present invention provides a compact data structure, called the forwarding table, that fits in main memory and trades accuracy for size.

The Forwarding Table

The forwarding table is derived at each router node from its routing state, taking into account the class of XPath queries that one wishes to efficiently route through the system. To allow the forwarding table to fit in main memory, it is constructed by employing path aggregation on the data paths contained in the routing state. The general idea for routing state aggregation is similar in the protocols: if the routing state contains two data paths, $P_1$ and $P_2$ with a common prefix $P_c$, we replace the entries for the two paths $P_1$ and $P_2$ in the index by a single entry for the prefix $P_c$, and map this prefix path to the information that represents the union of the information in the routing state to which $P_1$ and $P_2$ were mapped. The protocols under the open cooperation model, i.e., the replication and coordinator protocols, maintain routing states that map a data path to a set of data nodes and/or a coordinator node; routing state aggregation thus associates less precise information about data nodes and coordinator nodes with data paths. Similarly, the spanning tree protocol under the agreement model maintains routing states that map a data path to next-hop neighbors under the spanning tree; routing state aggregation thus associates less precise information about next-hop nodes with data paths. A query for $P_1$ would be sent to nodes that are relevant to either $P_1$ and $P_2$. Sending the query to additional data nodes does not compromise correctness because these data nodes will simply return empty results, but it does introduce a performance overhead at both router and data nodes for processing the query unnecessarily. We call the nodes that are not relevant to a query but receive the query because of routing state aggregation as false positives, and the ratio of the number of false positives to the number of relevant nodes as a. false positive ratio. More specifically, the forwarding table construction for the spanning tree and coordinator protocols is described as follows.

Coordinator Protocol: Aggregation

A router node R1 in the coordinator protocol constructs the forwarding table, from the routing state, as follows. The forwarding table is initialized to a suffix tree representation over the routing state. While the size of the forwarding table is above the desired threshold, do:

Select a set of leaf paths $\{p_j\}$ in the suffix tree, with the common parent corresponding to the common prefix $p_k$.
  Modify the information associated with $p_k$ in the suffix tree by unioning in the sets of data nodes and coordinator nodes associated with the $p_j$'s.
  Drop the $\{p_j\}$ paths (and their associated information) from the suffix tree.

There are many heuristics that can be used to determine the paths in the routing state that are aggregated. In our experiments, we use a heuristic that first aggregates the longest paths in the routing state.

Spanning Tree Protocol: Aggregation

The construction of the forwarding table in the spanning tree protocol is similar to the approach used in the coordinator protocol. The only difference is that routing state entries here have the form;

$(p_k, \mathcal{N}_k)$.

Hence, in the aggregation step, the forwarding table entries will have the form $(p'_k, \mathcal{N}'_k)$ where $\mathcal{N}'_k$ is the union of the next-hop neighbor sets $\mathcal{N}_k$ associated with paths $p_k$ that have $p'_k$ as a prefix.

Using the Forwarding Table

The forwarding table can be used both for query processing, and for update processing. In query processing, the query routing protocols can use the forwarding table instead of the routing state, to determine the data nodes, coordinator nodes, or next-hop neighbors, to which the query should be sent. Each lookup in the forwarding table is faster (since it involves a main memory lookup, instead of a disk I/O), but false positives are possible, potentially negating the benefits of the faster lookup. In the next section, we explore the performance tradeoffs that arise in query routing because of aggregation. In update processing, the update routing protocols can use the forwarding table in addition to the routing state. As new updates arrive, one can incrementally determine in an approximate fashion if the forwarding table needs to be modified, or if it needs to be recomputed from the (updated) routing state. This can permit lazy updates to the routing state on disk, while still guaranteeing consistency of the forwarding table with respect to the data path updates.

An Example

Assume that routing state aggregation is employed in the coordinator protocol, in the example shown in FIG. 1. In particular, assume that router node R1, employs aggregates paths AAA, AAB to AA*. As a result, the associated list of path coordinators becomes R2, R4 and the associated list of data nodes, D3, Ds. A query AAB originates now at node D1, which forwards it to router R1. R1 examines its forwarding table and identifies a match at the aggregated entry, AA*. According to the protocol, R1 sends the query to data nodes D3, D5 and also forwards the message "QuerySent(AAB, {D3,D5}) to R2 and R4. D3 and D5 receive the query from R1, execute it locally and send the results back to R1, which in turn forwards them to D1. Notice that node D5 has no answers and returns an empty result. This is a case of a false positive, taking place due to aggregation at AA* in node R1. In the meantime, R2 and R4 receive the QuerySent message from R1. R4 responds an empty set since it is not actually the coordinator for path AAB (another false positive). R2 examines its state, compares its entry for AAB with the received message and identifies that node D4 contains relevant data but has not received the query. As a result, R2 sends a message to R1 that D4 should be queried. R1 then sends a query message to D4, which answers the query and ships the results back. Finally, R1 forwards all query results to D1 and adds D4 to its set of data nodes for aggregated path AA*.

Assume now that routing state aggregation is employed in the spanning tree protocol example of FIG. 2. In particular, router R3 aggregates the paths AAA, AAB to AA*. In this case, the entry for AA* in R3's routing state is associated with R2, R4, D6. The query AAA originates at node D6. D6 answers it locally and also forwards it to router R3. The latter checks its routing state, matches the query against its entry for AA* and forwards the query to the corresponding neighbors, R2 and R4. R4 receives the query and checking its routing state, forwards the query to D5, which gets answered. The results reach D6 via R4 and R3. R2 however, finds that the only neighbor for AAA in its routing state points back to R3 from which the query arrived. Consequently, R2 responds immediately with empty results to R3. This is a false positive message resulting from the aggregation of routing state at router node R3.

Experimental Evaluation

The protocols described in the current invention are implemented in by way of example in the following experimental usage. In order to quantitatively evaluate the proposed protocols a detailed simulation model was implemented. The model implements instances of system architectures containing router nodes and data nodes inter-connected forming various topologies. The model is implemented using CSIM version18 and accepts the parameters shown in Table 1.

TABLE 1

Simulator Parameters

| | |
|---|---|
| Processor speed | 1700 MIPS |
| Network Bandwidth | 100 Mb/sec |

TABLE 1-continued

Simulator Parameters

| | |
|---|---|
| Message Setup | 10K instructions |
| Message header | 100 bytes |
| Acknowledge Msg. (incl. header) | 500 bytes |
| Reply Message Size | Gaussian w/ mean 50Kbytes |
| Per byte Msg cont | 500 instr. |
| Index Lookup (on disk) | 5000 μsec |
| Index Lookup (sensory) | 200 μsec |
| Index update (routing state) | 5000 μsec |

The experiments evaluated the impact different parameters have, including the topology of the architecture, data distribution, and queries, on the overall system performance and throughput. A description of the simulator model and metrics used is provided as follows.

Simulation Model

The simulator implements an open queuing model. Events (queries, path insertions/deletions) are issued by data nodes in uniform and independent fashion and propagated through the system. The simulator interfaces to the GT-ITM (Georgia Tech Internetwork Topology Model) topology generator, which is responsible for the generation of the simulators canonical as well as random topologies. XML data paths are generated uniformly from a fixed universe of tags and elements, in accordance to common XML benchmark generators and are allocated in data nodes in a uniform fashion. To quantify the effects of inserting new data paths in the architecture and in extent, our update processing protocols, we introduce the following parameter:

$$\text{diff-rate} = \frac{\text{number of new data paths inserted}}{\text{total number of data paths inserted}} \quad (1)$$

Assuming that a number of data paths already existing the system, an inserted data path is new when it is not already present in the system. The parameter diff-rate effectively quantifies the commonalities among data paths inserted, through a sequence of ran-do insertions and the data paths already existing in the system. We evaluated the performance of a comprehensive set of XPath queries, including prefix queries, ancestor descendent queries and branching queries. We tested workloads consisting of each query type in isolations well as workloads consisting of mixes of the above queries. In all cases the queries are chosen uniformly at random from the union of all paths existing in the data nodes of the system. The ancestor descendent queries contained a single "//" in our experiments, the branching queries contain two simple (not containing "//") paths. The main metric we use to quantify query performance is throughput, defined as:

$$\text{Throughput} = \frac{\text{Number of queries processed}}{\text{Time to process the queries}} \quad (2)$$

Query throughput is expressed in queries completed per second and is collected at 95% confidence interval. A query is completed when the data node that issued the query, receives all the query results. In the graphs that follow, we present query throughput as a function of data node selectivity defined as the fraction of data nodes in the system involved in query answering (i.e., receive the query and search their local indices). Update processing throughput (insertions/deletions of paths) is computed similarly, representing the total number of updates completed per second. An update is completed when all router nodes that should be aware of this update are informed and adjust their internal structures. In our evaluation we conducted a comprehensive set of experiments to quantify the tradeoffs existing in the performance of the protocols we propose, namely the coordinator and the spanning tree protocols. We tested many different topologies that constitute a representative sample of the class of possible router interconnections. In particular, we experimented with router interconnections forming a (a) tree topology (b) graph topology generated by the GT-ITM tool and (c) full mesh topology. The results obtained for the different router topologies were comparable and consistent. Thus, for brevity, we present results only for the mesh router topology. All system configurations tested, operating under the Coordinator (labeled Coordinator in the graphs) and Spanning Tree (labeled Spanning Tree in the graphs) protocols consist of 20 router nodes and 100 data nodes. For the Spanning tree protocol, we include an extension x (Spanning Tree-x) where x refers to the number of spanning trees the corresponding system is using. In all cases the decision to attach a particular data node (out of the 100 data nodes in total) to a router node is taken uniformly at random. Communication between router nodes, takes place through the overlay network imposed by router agreements. We also include in our evaluation, performance results for a system configuration implementing the replication protocol (labeled Replication), which consists of 20 router nodes with 100 data nodes connected to them, uniformly at random.

Update Processing Protocol Evaluation

Figure 3:
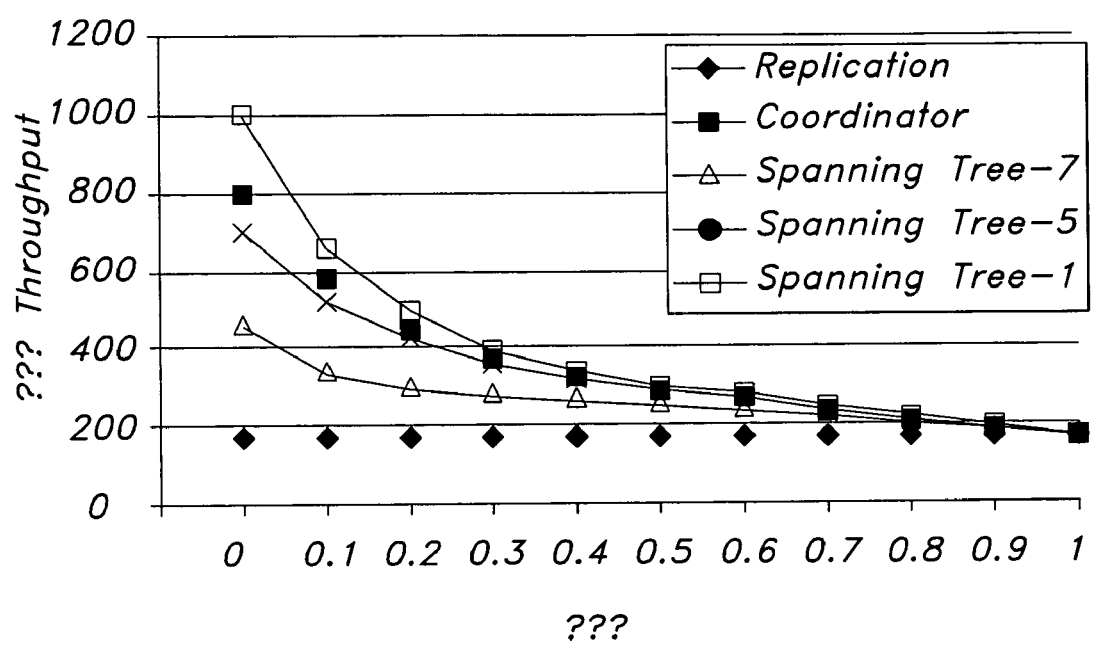
FIG. 3 is a graph of experimental results for Insertion Throughput versus diff rate according to the present invention.

The first set of experiments evaluate the performance of the systems when a workload consisting solely of updates is presented. The goal is to understand the properties of update processing in each of the protocols studied. To keep this experiment simple, we present our results for a workload consisting only of insertions (results for a workload of deletions of paths as well as mixed workloads of insertions/deletions were similar). Turning to FIG. 3 there is presented the results of this experiment. It represents the insertion throughput for the coordinator and the spanning tree protocols (using different numbers of spanning trees), as a function of diff-rate. As diff-rate increases, meaning that increasingly, insert events introduce more new paths in the system, throughput, in terms of insertions completed per second, progressively decreases approaching the throughput of the replication protocol, which appears steady. This behavior can be explained by a closer look at the specifics of the different update processing protocols. For a system implementing the replication protocol, each update is propagated to every router node, so the overhead incurred is the same, independent of diff-rate. For the coordinator protocol, notice that when a router node receives a newly inserted path not present in its routing state, the router node advertises this path to all router nodes in the system, and every router inserts the path into its routing state. In contrast, when the data path exists somewhere in the system, only the router node that receives it and the coordinator node for that path performs this work. It is evident that the number of messages and processing involved in the case of new paths is substantially more than in the case of paths already known. In the limit (diff-rate=1), all paths inserted are new and consistently the update propagation throughput becomes same as that of the replication protocol, since every router must process every path. Finally, for the spanning tree protocol, for small values of diff-rate (less globally new paths) the chance that updates are blocked by routers down a spanning tree path is higher. Thus, throughput appears high and tails off as cliff-rate increases (more globally new paths), to reach that of the replication protocol. As the number of spanning trees increases (from 1 to 7 shown in FIG. 3) throughput increases, since the chances of blocking an update early on, in some spanning tree path, increase. As the number of spanning trees increases, the update processing throughput attainable by the spanning tree protocol becomes closer to the one attained by the coordinator protocol.

Query Throughput Evaluation Without Routing State Aggregation

Figure 4:
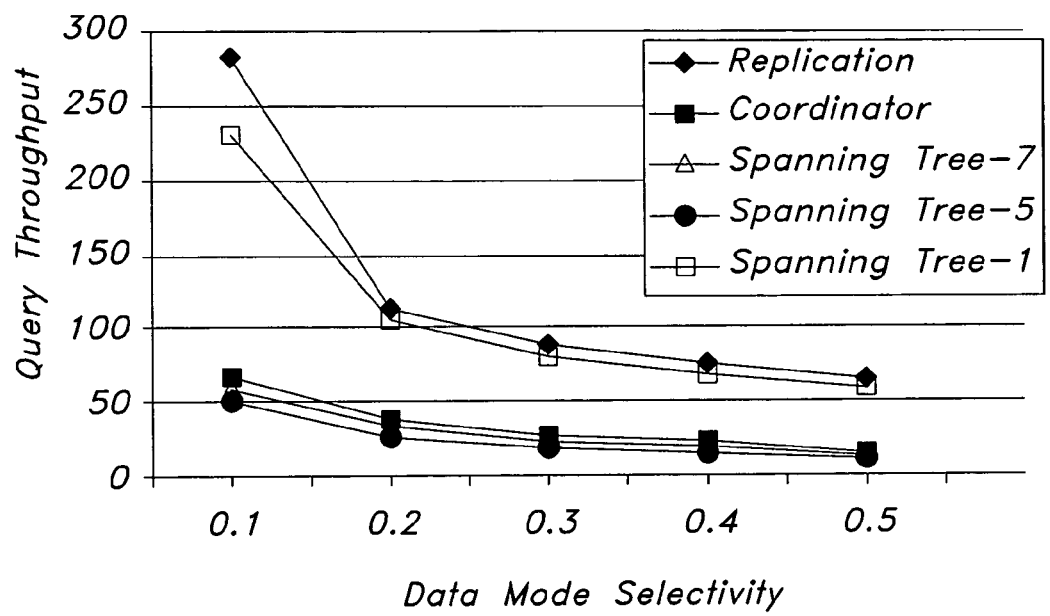
FIG. 4 is a graph of query throughput versus data node selectivity for suffix querieis according to the present invention.
Figure 5A:
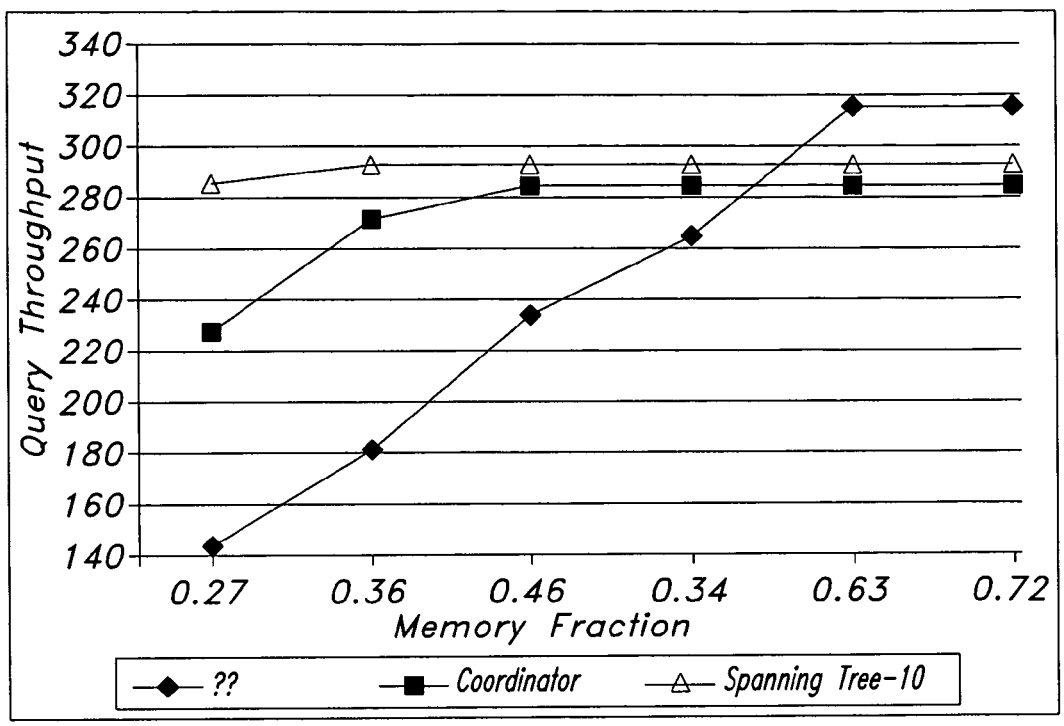
FIG. 5 is a graph of throughput for suffix queries as a function of available memory and data node selectivity according to the present invention.
Figure 5B:
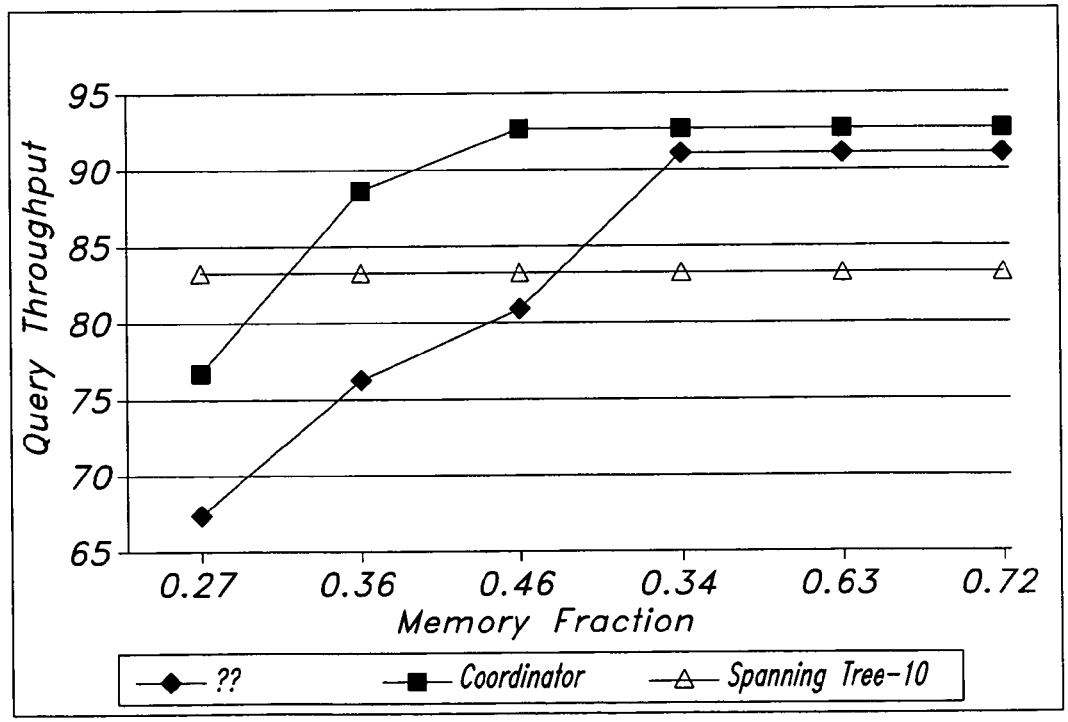
Figure 5C:
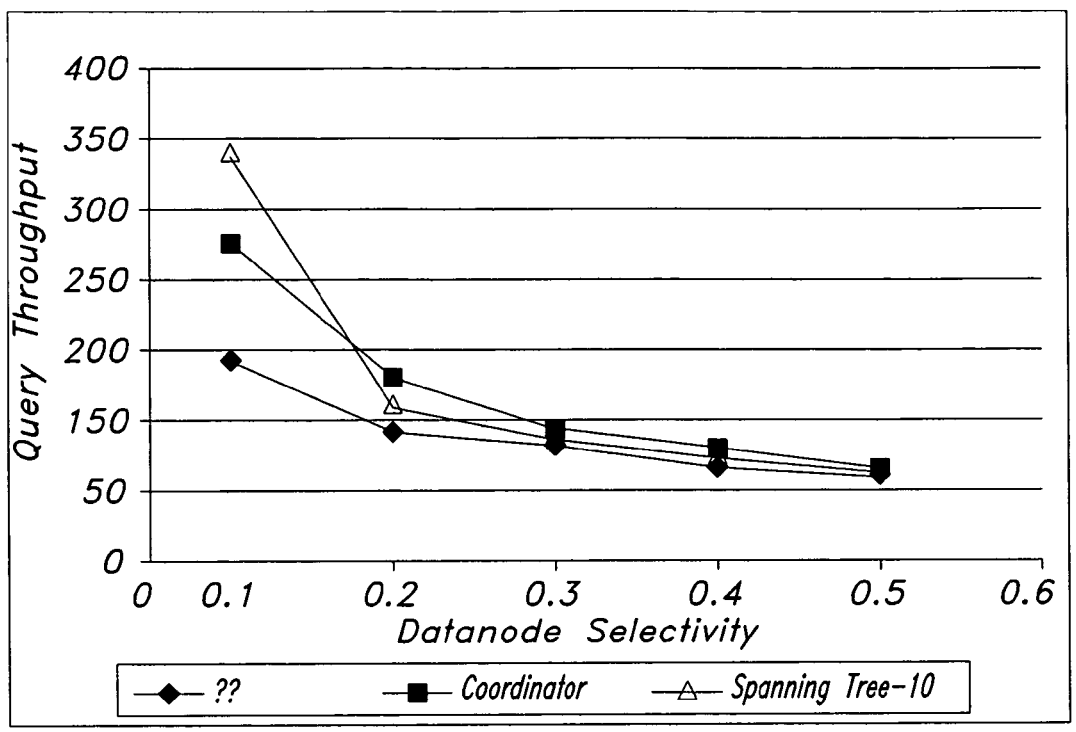
Figure 5D:
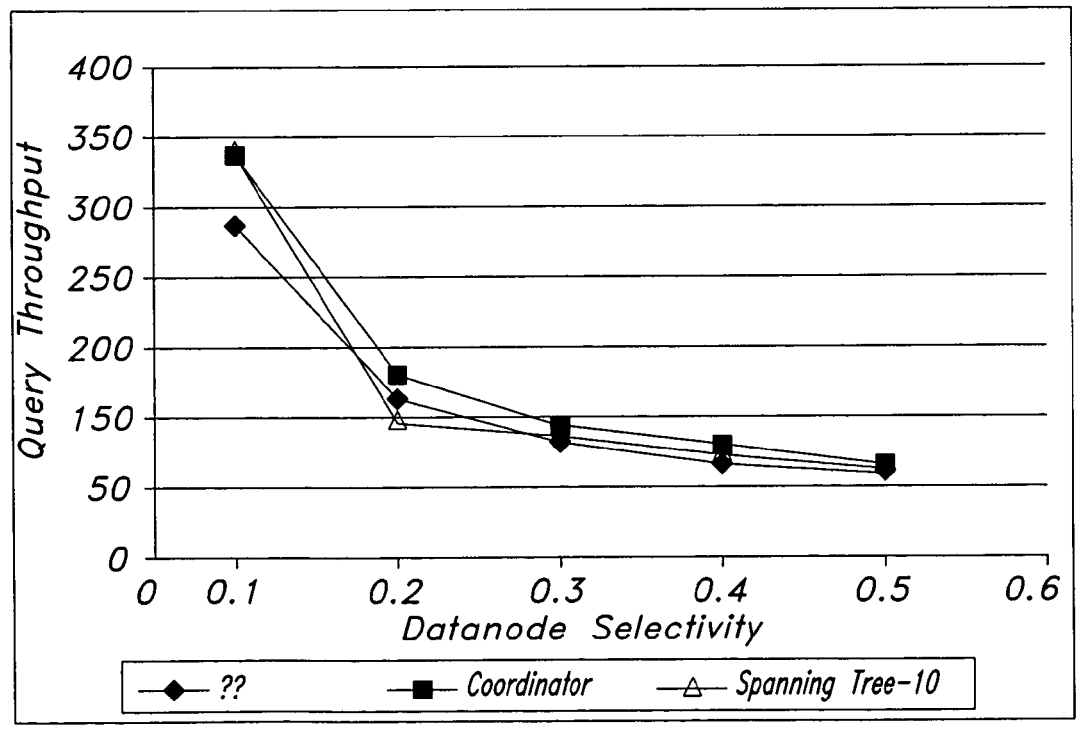

Turning now to the evaluation of the query throughput attained by the different protocols, there is first described the evaluation of two limiting cases in which routing state aggregation is not enabled. These are the cases where routing state at each router is either entirely stored on disk or fits entirely in memory. In both cases no false positive messages occur. The first focus is on the case, where routing state in each router for each protocol is entirely stored on disk. Turning to FIG. 4 there is presented a query throughput as the data node selectivity increases for workloads consisting of suffix queries. In such a setting, the replication protocol is the best choice. The coordinator protocol is competitive followed by the spanning tree protocol. The replication protocol incurs minimal overhead at the router node the query first arrives and it immediately obtains the list of data nodes involved in query answering. In the coordinator protocol, the query has to be propagated to the coordinator router and thus the cost is higher. In contrast in the spanning tree protocol, all routers in the spanning tree path are involved, incurring a much higher cost. It is also noted that the non monotonicity in the performance of the spanning tree protocol as a function of the number of spanning trees deployed. When a single spanning tree is used (Spanning Tree-1 in FIG. 4) queries and answers travel through the same set of router nodes. When we increase the number of spanning trees (Spanning Tree-3 in FIG. 4) performance improves, because different sets of router nodes participate in query answering, even though queries might travel multiple spanning trees as dictated by the spanning tree protocol for query answering. When increasing the number of spanning tree seven further (Spanning Tree-7 in FIG. 4), the performance of the spanning tree protocol deteriorates slightly, since complex queries travel and reach router nodes multiple times, due to duplicate routing. In case memory resources at router nodes are not constraint, routing state at each router and for each protocol fits in memory. In this case, there is very little difference in query performance among the three protocols. The reason is that, essentially only the less expensive query messages (relatively to disk accesses) account for the performance differences between the protocols.

Query Throughput Evaluation With Routing State Aggregation

The previous set of experiments, established the relative performance of the protocols in two limiting cases (routing state is either disk or memory resident, without aggregation). There in now described the case where routing state is aggregated in each protocol to bring the storage requirements to desired levels, specified by the memory available at router nodes. This instigates false positive messages in the system. We conducted experiments evaluating query throughput as a function of the memory available at router nodes. We present total memory available for the forwarding table at each router node, as a fraction of the total size of the routing state in the replication protocol. Given a total main memory bound, the routing states in each router and for each protocol are aggregated to reach that bound, so that the resulting forwarding tables fit in memory. Turning to FIG. 5 there is presented the result of an experiment, on which aggregation is employed in all protocols, varying the size of available memory when data node selectivity is 0.1 and 0.3 (FIGS. 5($a$)($b$)) and when available memory is a fraction of 0.1 and 0.3 of the space required by the routing state in the replication protocol (FIGS. 5($c$)($d$)). The query type used in these experiments is suffix (results for other query types where similar). In FIGS. 5($a$)($b$), when available memory is small (as a fraction of the total space required by the replication protocol) the spanning tree protocol provides great performance benefits. The reason is that both the replication and the coordinator protocols incur a large number of false positive messages, flooding both the network and data nodes with query requests. In contrast, the spanning tree protocol reaches relevant data nodes, without suffering much from the side effects of constraint memory. As the memory increases, the performance of the spanning tree protocol remains relatively stable; both the coordinator and the replication protocol, improve their performance as the number of false positives they incur is reduced. Increasing data node selectivity (FIG. 5($b$)), reduces over-all throughput as more messages exist in the system (larger fraction of data nodes participates in query processing) but the overall trends remains consistent. We conducted a series of experiments, measuring throughput for a mix of queries of various types and update events, varying the relative participation of queries and updates in the mix. The overall throughput trends remain consistent.

The Reachability Proof in the Spanning Tree Protocol

We assume that updates happen without overlapping with each other, i.e., an update comes only after the propagation of the previous ones has finished. In the rest of the discussion, we only consider a root-to leaf path P and its corresponding entry in each router's routing state. Also, we only consider updates that are path additions; path deletions and an arbitrary sequence of updates consisting of both path insertions and deletions can be handled similarly.

Definition A.1 Given two routers R and R', if there exists a list of routers ($R_0$=R, $R_1$, . . . , $R_k$=R') such that $R_i$ appears in $R_{i-1}$'s routing state for i=1, . . . , k, then we say R can reach R'.

Note that reachability is not symmetric. According to our protocol, if $R_1$ can reach $R_2$, then after the propagation of a new update, $R_1$ can still reach $R_2$.

We say a router R contains path P if there is a datanode that contains path P and is directly connected to R. If for every router R that contains P, all the other routers can reach R, then we say the system is completely reachable.

When the system S is initially established, we assume there is no router containing path P. Thus the routing state for each router is empty initially. We denote the initial state as $s_0$. Given a sequence of updates ($u_1$, . . . , $u_k$, . . . ), we use $s_k$ to denote the state of the system after k updates.

Lemma 1 Suppose an update u happens in a router $R_0$, if a router R receives an update message for u, then after the propagation of u is over, R can reach $R_0$.

Proof 1 Let ($R_0$, . . . , $R_k$=R) be the travel list of the first update message of u that R receives. We prove the lemma by induction on k.

When k=1, R receives the update from $R_0$ directly. Either $R_0$ is already in R's routing state or R will add $R_0$ to its routing state. In either case, R can reach $R_0$.

Assume when k=n, n≧1, the lemma holds.

When k=n+1, after receiving the update message, either $R_n$ is already in R's routing state or R will add $R_n$ to its routing state. In either case, R can reach $R_n$. By the induction hypothesis, $R_n$ can reach $R_0$. Therefore, R can reach $R_0$.

Lemma 2 Let the topology of S be any connected graph G and $(u_1, \ldots, u_k)$ be a sequence of updates, we have $s_1$ and $s_2$ are completely reachable.

Proof 2 In the case of $s_1$, since initially all the router's routing states are empty, every router will receive the update message. According to 1, all the router can reach the router that contains path P.

For the case of $s_2$, suppose the second update $u_2$ happens at node R and $u_1$ happens at node R'. As we show above, R can reach R'. Let the path be $R_0=R, R_1, \ldots, R_k=R'$. Before $u_2$ happens, every $R_i$, i=0, ..., k−1, has only one entry in their routing state which is $R_{i+1}$. Similar to the proof of 1, we can prove by induction on k that every router in the path will receive the update message of $u_2$. Therefore after the propagation of $u_2$, R' can reach R. Since every router can reach R', we have every router can also reach R.

Theorem 1 Let the topology of S be any connected tree T and $(u_1, \ldots, u_k)$ be a sequence of updates, we have $s_k$ are completely reachable.

Proof 3 We prove that theorem by induction on k.

When k=1 or k=2, by lemma 2, the theorem holds.

Assume when k=n, n≧2, the theorem holds.

When k=n+1, suppose update $u_{n+1}$ happens at datanode R. Let X and Y be two routers that contain P before $u_{n+1}$ happens. Consider the path between R, X and the path between R, Y. Let R' be the common node of the two paths that are furthest from R. We call R' the joint node of R,X,Y, denoted as joint (R,X,Y). Note that the joint node may be R itself. We select routers X' and Y' such that joint(R,X,Y) is the closest one to R among all pairs of routers that contain P before $u_{n+1}$ happens. If R'=R, since X can reach Y, we must have X can reach R. Therefore, $s_{n+1}$ is completely reachable. Otherwise, consider the path between R and R' ($R_1=R, \ldots, R_t=R'$). For each router $R_i$ in the path, to reach all routers with path P, it has to go through $R_{i+1}$, i=1, ..., t−1. Therefore, when $u_{n+1}$ happens at R, we must have R' receives an update message of $u_{n+1}$. Thus R' can reach R. Since X' can reach Y', and there is only on path in a tree between X' and Y', X' can reach R'. Therefore, X' can reach R. Since every router can reach X', we have $s_{n+1}$ is completely reachable.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

What is claimed is:

1. A method for accessing data over a wide area network comprising:
   providing a decentralized architecture comprising a plurality of data nodes each having a database and routing information, a query processor and a path index, and a plurality of router nodes each having a routing state;
   restricting communication between the plurality of router nodes in accordance with an agreement;
   maintaining a routing state in said router nodes;
   aggregating path information associated with a routing state by combining data paths to form a common data path, thereby reducing a number of data paths stored in memory of said router nodes;
   broadcasting routing information updates to said routing state from said databases to said router nodes;
   creating mapping indices utilizing said routing state to data items;
   initiating communication between at least two of the plurality of routers in accordance with the agreement, the communication concerning enabling access to one or more of said data items from at least one data node through at least one of the plurality of routers and being based on said mapping indices, wherein initiating communication comprises sending an advertisement comprising at least one of a path insertion or path deletion from a first one of the plurality of routers to at least one of the plurality of routers with which the first one of the plurality of routers has the agreement; and
   blocking propagation of the advertisement by the at least one of the plurality of routers with which the first one of the plurality of routers has the agreement when the at least one of the plurality of routers has more than one next-hop router in a routing state for path information associated with the advertisement.

2. The method of claim 1, wherein initiating communication comprises sending a query from a first one of the plurality of routers to a second one of the plurality of the routers in accordance with the agreement.

3. The method of claim 2, further comprising sending the query from the second one of the plurality of routers to a third one of the plurality of routers in accordance with the agreement, the first one of the plurality of routers and the third one of the plurality router not having the agreement so that direct communication between the first one of the plurality of routers and the third one of the plurality of routers is prohibited.

4. The method of claim 1, further comprising sending the advertisement from the at least one of the plurality of routers with which the first one of the plurality of routers has the agreement to another router that does not have the agreement with the first one of the plurality of routers.

5. The method of claim 1, further comprising maintaining a routing state at a first one of the plurality of routers, the routing state comprising information from only those of the plurality of routers that have the agreement with the first one of the routers.

6. A method for accessing data over a wide area network comprising:
   providing a decentralized architecture comprising a plurality of data nodes each having a database and routing information, a query processor and a path index, and a plurality of router nodes each having a routing state;
   restricting communication between the plurality of router nodes in accordance with an agreement;
   maintaining in said router nodes a data path for a set of said data nodes;
   updating routing information to said data path in said router nodes;
   aggregating path information associated with a routing state by combining data paths to form a common data path, thereby reducing a number of data paths stored in memory of said router nodes;
   creating mapping indices utilizing said routing state to data items; and
   initiating communication between at least two of the plurality of routers in accordance with the agreement, the communication concerning enabling access to one or more of said data items from at least one data node through at least one of the plurality of routers based one said mapping indices, wherein initiating communication comprises sending an advertisement comprising at least one of a path insertion or path deletion from a first one of the plurality of routers to at least one of the plurality of routers with which the first one of the plurality of routers has the agreement; and blocking propagation of the advertisement by the at least one of the plurality of routers with which the first one of the plurality of routers has the agreement when the at least one of the plurality of routers has more than one next-hop router in a routing state for path information associated with the advertisement.

7. The method of claim 6, wherein initiating communication comprises sending a query from a first one of the plurality of routers to a second one of the plurality of the routers in accordance with the agreement.

8. The method of claim 7, further comprising sending the query from the second one of the plurality of routers to a third one of the plurality of routers in accordance with the agreement, the first one of the plurality of routers and the third one of the plurality router not having the agreement so that direct communication between the first one of the plurality of routers and the third one of the plurality of routers is prohibited.

9. A system comprising:
  a network having a decentralized architecture, the network comprising:
    a plurality of data nodes each having a database and routing information, a query processor and a path index; and
    a plurality of router nodes each having a routing state, communication between the plurality of router nodes being restricted in accordance with an agreement, said routing nodes configured to:
      maintain said routing state in said router nodes;
      aggregate path information associated with said routing state by combining data paths to form a common data path, thereby reducing a number of data paths stored in memory of said router nodes;
      broadcast routing information updates to said routing state from said databases to said router nodes;
      create mapping indices utilizing said routing state to data items;
      route path queries to said databases by following said mapping indices, said routing performed by initiating communication between at least two of the plurality of routers in accordance with the agreement, the communication concerning enabling access to information from at least one data node through at least one of the plurality of routers, wherein initiating communication comprises sending an advertisement comprising at least one of a path insertion or path deletion from a first one of the plurality of routers to at least one of the plurality of routers with which the first one of the plurality of routers has the agreement; and
      block propagation of the advertisement by the at least one of those of the plurality of routers with which the first one of the plurality of routers has the agreement when the at least one of the plurality of routers has more than one next-hop router in a routing state for path information associated with the advertisement.

10. The system of claim 9, wherein initiating communication comprises sending a query from a first one of the plurality of routers to a second one of the plurality of the routers in accordance with the agreement.

11. The system of claim 10, wherein information access is managed in the network by sending the query from the second one of the plurality of routers to a third one of the plurality of routers in accordance with the agreement, the first one of the plurality of routers and the third one of the plurality router not having the agreement so that direct communication between the first one of the plurality of routers and the third one of the plurality of routers is prohibited.

12. The system of claim 9, wherein information access is managed in a network by sending the advertisement from the at least one of the plurality of routers with which the first one of the plurality of routers has the agreement to another router that does not have the agreement with the first one of the plurality of routers.

\* \* \* \* \*